Figure 1:
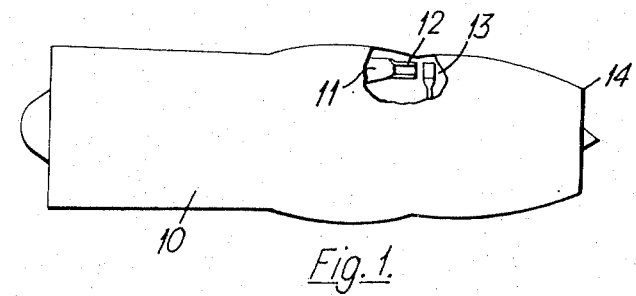

United States Patent [19]
Redman

[11] 3,799,696
[45] Mar. 26, 1974

[54] COOLED VANE OR BLADE FOR A GAS TURBINE ENGINE

[75] Inventor: Robert Frederick Redman, Beeston, England

[73] Assignee: Rolls-Royce (1971) Limited, London, England

[22] Filed: June 29, 1972

[21] Appl. No.: 267,581

[30] Foreign Application Priority Data
July 2, 1971  Great Britain............... 31065/71

[52] U.S. Cl. .................................. 416/97, 415/115
[51] Int. Cl. ........................................... F01d 5/08
[58] Field of Search .......................... 416/96–97, 416/90; 415/115

[56] References Cited
UNITED STATES PATENTS

| | | | |
|---|---|---|---|
| 3,045,965 | 7/1962 | Bowmer | 416/90 |
| 3,528,751 | 9/1970 | Quinones et al. | 416/97 X |
| 3,533,711 | 10/1970 | Kercher | 416/90 |
| 3,628,880 | 12/1971 | Smuland et al. | 415/115 |
| 3,628,885 | 12/1971 | Sidenstick et al. | 416/96 |
| 3,700,348 | 10/1972 | Corsmeier et al. | 416/90 |

*Primary Examiner*—Everette A. Powell, Jr.
*Attorney, Agent, or Firm*—Cushman, Darby and Cushman

[57] ABSTRACT

A hollow cooled blade or vane for a gas turbine engine comprises a hollow leading edge portion given substantially unrestricted access to a source of cooling air and provided with film cooling holes to the blade outer surface, a hollow center portion with an air entry tube supplied with cooling air and apertured to cause the air to impinge on the blade inner surface, and a trailing edge portion having a sinuous passage for cooling air therein.

6 Claims, 5 Drawing Figures

COOLED VANE OR BLADE FOR A GAS TURBINE ENGINE

This invention relates to a cooled vane or blade for a gas turbine engine.

One of the difficulties involved in providing cooled vanes or blades for gas turbine engines lies in the relatively small difference between the pressure of the cooling air and the pressures existing outside the vane; on some parts of the vane the pressures outside may be greater than the available cooling air pressure. This therefore makes it difficult to provide cooling such as film cooling in which air is allowed to pass from the inside to the outside of the blade.

The present invention provides a cooled vane or blade for a gas turbine engine which makes the optimum use of the available cooling fluid.

According to the present invention a cooled vane or blade for a gas turbine engine comprises a hollow leading edge blade portion having substantially unrestricted access to an exterior part of the blade which is supplied with cooling air, the leading edge section being provided with holes from the inner to the outer surface to provide film cooling, a hollow centre blade portion comprising an air entry tube open to said exterior part and apertured to cause the air to impinge upon the inner surfaces of the central portion, and a trailing edge blade portion having a sinuous passage for cooling air extending therein.

Conveniently the exterior part supplied with cooling air comprises the surface of the shroud or platform distant from the aerofoil section.

Preferably holes are also provided passing from the interior to the exterior surface of the blade in said central section and in said trailing edge section.

The substantially unrestricted access to the hollow leading edge blade portion may be provided by arranging that this portion has direct access or it may be provided by way of a cooling air tube inside the blade which is apertured to allow substantially unrestricted flow.

Air may flow to said sinuous passage from said central portion, or alternatively the passage may have direct access to said exterior surface.

In a preferred embodiment the trailing edge of the blade is provided with a longitudinally extending slot from which the air may flow having passed along the passage.

In one embodiment the air entry tube is made up from a pair of apertured sheets lying approximately parallel with the blade flanks and a pair of diaphragms which divide the blade into its leading edge, central and trailing edge portions.

Figure 3:
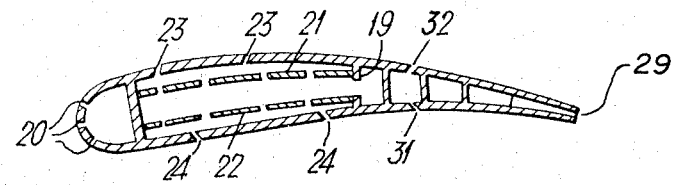
Figure 2:
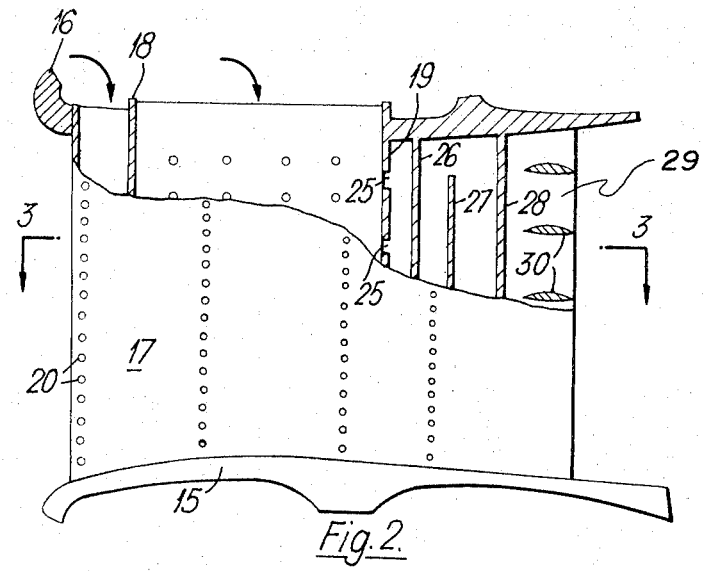
Figure 4:
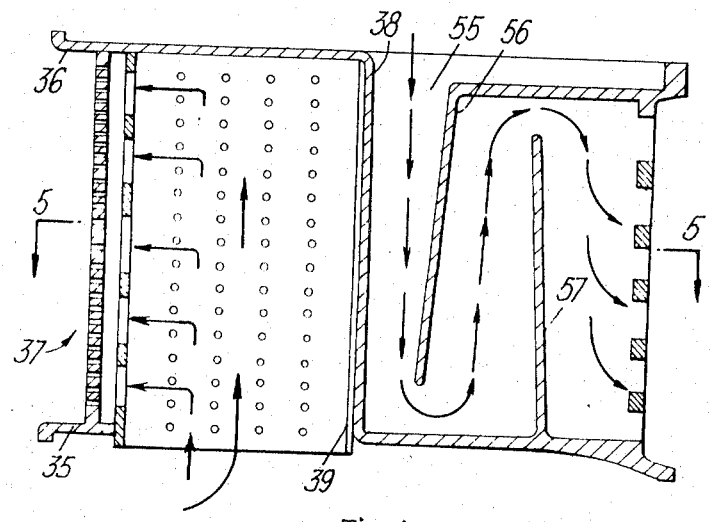
Figure 5:
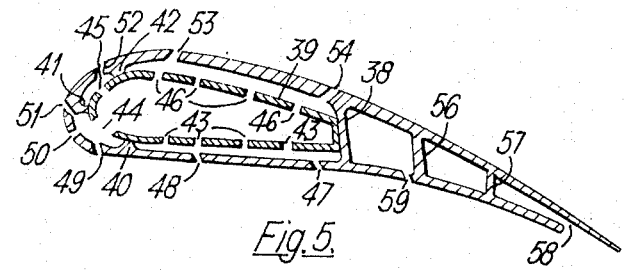

The invention will now be particularly described, merely by way of example with reference to the accompanying drawings in which:

FIG. 1 is a diagrammatic view of a gas turbine engine broken away to show a vane in accordance with the invention, FIG. 2 is an enlarged and partly broken away view of the vane of FIG. 1, FIG. 3 is a section on the line 3—3 of FIG. 2, FIG. 4 is a sectional view substantially through the mid-chord of an alternative embodiment of blade according to the invention, and FIG. 5 is a section on the line 5—5 of FIG. 4.

In FIG. 1 there is shown a gas turbine engine comprising a compressor section 10, combustion section 11 having nozzle guide vanes 12, turbine section 13 and exhaust nozzle 14. To allow the combustion temperature to be as high as possible the nozzle guide vanes 12 are cooled, and one of the guide vanes is shown enlarged in FIG. 2 cut away so that the cooling arrangements are visible.

Each vane 12 comprises inner and outer platform sections 15 and 16, and an aerofoil section 17. The section 17 is hollow and is divided into leading edge, central and trailing edge portions by diaphragms 18 and 19. The leading edge portion is formed between the leading edge portion of the aerofoil section 17 and the diaphragm 18, and the passage thus formed is continued through the outer platform 16 and hence to a plenum chamber formed on the upper surface of this platform. A number of rows of film cooling holes 20 are provided which extend from the interior surface to the exterior surface of this leading edge section, and allow cooling air to flow from the inside to the outside surface and to provide film cooling.

The central portion of the blade is formed between the diaphragms 18 and 19 and the flanks of the blade, and is provided with an air entry tube. This tube is formed by a pair of apertured sheets 21 and 22 which lie approximately parallel with the flanks of the blade. This tube is completed at its leading and trailing edges by the diaphragms 18 and 19. The outer platform 16 is again apertured in line with the tube, again allowing cooling air to flow from the plenum chamber directly into the cooling air tube. Once the air flows into the tube it is allowed to pass through the apertures in the sheets 21 and 22 and thus to impinge on the inner surfaces of the flanks of the blade.

Film cooling holes are provided at 23 and 24 in these flank surfaces, the holes extending from the interior to the exterior of the flanks and allowing air to flow to the exterior of the blade and provide film cooling.

In the present instance the rear diaphragm 19 is apertured at 25 so that a proportion of the cooling air entry the cooling air tube flows through and into the trailing edge portion of the blade. This portion is divided by diaphragms 26, 27 and 28 into separate passages which join with adjacent passages at alternate extremities, thus providing a sinuous pasage through which the air can flow. The rearmost of these passages extends to form a slot 29 from the trailing edge of the blade, while struts 30 extend across this slot 29 to retain the separate parts of the blades together and to provide some direction for the airflow.

Additionally film cooling holes 31 and 32 extend from one of the passages formed between the diaphragms 26 and 27 to the exterior surface of the blade thus providing film cooling of this exterior surface.

Operation of this system is as follows:

Cooling air is fed by means not shown to the exterior surface of the platform 16 and thus flows directly into the leading edge duct and into the air entry tube. This air is at the highest pressure available, and since it flows directly into the leading edge tube it does not suffer any appreciable loss in pressure. It is therefore able to pass from the interior of the duct to the exterior leading edge surface of the blade where the pressure is relatively high and there to perform film cooling.

Air from the air entry tube is metered by the apertured sheets 21 and 22 and impinges on the inner surfaces of the flanks of the blade, thus providing some cooling of the flanks. The air then passes through the film cooling holes to the exterior surface of the blade and provides film cooling of this central portion.

A proportion of the air from the cooling tube passes through the diaphragm 19 and into the first passage of the trailing edge formed between the diaphragms 19 and 26. It then flows through the sinuous passage formed between the diaphragms 26, 27 and 28, the majority of the air exiting through the trailing edge slot 29. Additionally a small proportion of the air passes through the film cooling holes 31 and 32 to provide film cooling of the exterior surface of the trailing edge.

It will be seen that this construction enables the efficient use of cooling air for the various parts of the blade; high pressure air is directly used for film cooling the high pressure leading edge of the blade, impingement cooling of the central portion enables efficient use of the air in this part and the sinuous multi-pass trailing edge allows efficient cooling in the restricted thickness available.

It will be understood that it will be possible to use this system for a blade rather than a vane, and that it may not be necessary in some circumstances to provide all the various film cooling holes shown in the embodiment above.

In FIGS. 4 and 5 there is shown a further embodiment of vane which differs in detail from that in the previous Figure. Here again the vane comprises inner and outer platform sections 35 and 36 and an aerofoil portion 37. The portion 37 is hollow and is divided into a leading and a trailing section by a diaphragm 38. The leading section is formed between the leading section of the aerofoil portion 37 and the diaphragm 38, and an air entry tube 39 extends within this section from the inner platform section 35 to the outer platform 36. The tube has an elongated cross-section which approximates in shape to that of the interior of the leading section of the aerofoil, and is smaller than this interior so that a clearance space is left between the tube and the leading section interior. At its rearmost edge the tube abuts and seals against the diaphragm 38.

To enable the air entry tube 39 to be fed with cooling air it extends through the inner platform 35 into a cooling air manifold, while its opposite end is blocked off by the outer platform 36. As can best be seen in FIG. 5 the tube 39 is retained by and seals against a number of ribs 40, 41 and 42 in addition to the diaphragm 38; in this way the clearance space between the tube 39 and the inside of the blade is divided into four separate regions. Each of these regions is provided with a supply of air from the tube 39 which is apertured at 43, 44, 45 and 46 to allow cooling air to flow into these regions respectively, and each region is provided with film cooling holes through the blade wall to the outer surface of the blade to allow the flow of film cooling air.

As can best be seen in FIG. 5, the region between the diaphragm 38 and the rib 40 is provided with two rows 47 and 48 of cooling holes; the region between the ribs 40 and 41 has three rows 49, 50 and 51 of cooling holes; the region between the ribs 41 and 42 has one row 52 and the region between the rib 42 and the diaphragm 38 has two rows 53 and 54.

The construction of the trailing portion of the blade is provided with a multi-pass cooling system similar to that of the previous embodiment. The outer platform is apertured at 55 to allow the flow of cooling air into a sinuous passage formed by diaphragm 56 and 57; the diaphragm 56 is stopped short of the platform 35 but extends to the platform 36, while the diaphragm 57 extends from the platform 35 to stop short of the platform 36. Thus three passages are formed, and the passage between the diaphragm 57 and the trailing edge is allowed to break through the trailing edge surface of the blade at 58 to provide air exit passages.

Additionally to the film cooling holes provided in the leading section, a further row 59 is provided which pass from the foremost of the passages to the concave flank of the blade.

Operation of the cooling system of this embodiment is as follows:

Cooling air is fed to adjacent the platforms 35 and 36 and that adjacent the platform 35 flows into the cooling air entry tube 39 and flows out through the various apertures into the respective part of the clearance space. The various apertures are arranged to provide different restrictions to the flow, and thus to produce different pressures in the clearance spaces. Thus the holes 44 are arranged to give almost no restriction to the flow, since the pressure of the external gas at the nose is at its maximum. The air is thus of sufficient pressure to flow out through the film holes against the high external pressure. The holes 46 are arranged to give the lowest pressure of all, and they provide impingement cooling of the convex, low pressure flank of the blade while allowing the film cooling air a sufficient margin over the external low pressure. The holes 43 and 45 are arranged to give an intermediate pressure to match the external pressures of these regions.

The trailing portion communicates by way of the aperture 55 with the air source, and the air then flows through the sinuous passages and exits through the exit passages at 58. Additionally, some air is allowed to flow through the film cooling holes 59 to cool the concave trailing edge portion.

It will be noted that the pressures of the cooling air at the inner and outer platforms need not be of the same pressure. Once again the cooling system could be used for a blade rather than vane, if necessary with the cooling arrangement modified to provide supply of air to both portions of the blade from the same platform.

Although not described above, the trailing edge sinuous passage may be provided with pedestals or other surface area extending features to improve cooling. Again, it may be necessary to provide further supporting means for the air entry tube 39; these may comprise chordwise extending ribs in the internal blade surface.

I claim:

1. A cooled vane or blade for a gas turbine engine comprising a hollow leading edge blade portion having substantially unrestricted access to an exterior blade part adapted to be supplied with cooling air, said unrestricted access providing direct cooling to the interior surface of said hollow leading edge portion, the leading edge portion being provided with holes from the inner to the outer surface to provide film cooling, a hollow center blade portion separate from said hollow leading edge portion and comprising an air entry tube open to said exterior part and apertured to cause the air to impinge upon the inner surface of the central portion, said center portion having film cooling holes passing from the interior to the exterior surface thereof, and a trailing edge blade portion having a sinuous passage for cooling air extending therein.

2. A cooled vane or blade as claimed in claim 1 and in which said blade comprises an aerofoil section and said exterior part supplied with cooling air comprises the surface of the shroud or platform distant from the aerofoil section.

3. A cooled blade as claimed in claim 1 and comprising further film cooling holes passing from the interior to the exterior surface of the blade in said trailing edge portion.

4. A cooled vane or blade as claimed in claim 1 and in which air flows to said sinuous passage from said central portion.

5. A cooled vane or blade as claimed in claim 1 and comprising a longitudinally extending trailing edge slot from which the air may flow having passed along the passage.

6. A cooled vane or blade as claimed in claim 1 and in which the air entry tube is formed by a pair of apertured sheets lying approximately parallel with the blade flanks and a pair of diaphragms which divide the blade into its leading edge, central and trailing edge portions.

* * * * *